United States Patent [19]
Baillet et al.

[11] 3,858,002
[45] Dec. 31, 1974

[54] CONTROL DEVICE FOR A CAMERA FOR TAKING AERIAL PHOTOGRAPHS BY MONOLINE SCANNING

[75] Inventors: Gerard Eugene Baillet, Choisy-Le-Roi; Andre Marcel Chabonat, Versailles, both of France

[73] Assignee: Societe Anonyme de Telecommunications, Paris, France

[22] Filed: Apr. 27, 1973

[21] Appl. No.: 355,038

[52] U.S. Cl. ............................... 178/7.2, 343/5 PC
[51] Int. Cl. ........................................... H04n 5/88
[58] Field of Search ............... 178/DIG. 20, 7.2, 7.6, 178/6.8, DIG. 38, DIG. 28, DIG. 29; 95/12, 5; 244/77 M, 81, 79; 343/5 PC, 5 ST, 5 MM

[56] References Cited
UNITED STATES PATENTS
3,371,161  2/1968  Crovella...................... 178/DIG. 40

*Primary Examiner*—Richard Murray
*Assistant Examiner*—R. John Godfrey

[57] ABSTRACT

A control device for a camera taking aerial photographs by monoline scanning comprising the equivalent of a mirror rotatable with respect to a reference plane of an aircraft carrying the camera, said control device comprising a gyrometer connected to the structure of the aircraft and furnishing voltage measurements of the angular velocity of the aircraft in its rolling motion, and an electronic system for integrating with respect to time the value of the voltage furnished by the gyrometer, means for producing a first signal at the moment when the plane of the mirror is coincident with the reference plane, means for producing from said first signal a second signal which is modulated, in duration by the voltage furnished by said measuring device, means for producing at the end of the second signal a third signal of constant duration, and means for applying said third signal to the control of the effective scanning, by the monoline scanning device, of the ground flown over by the aircraft.

4 Claims, 10 Drawing Figures

CONTROL DEVICE FOR A CAMERA FOR TAKING AERIAL PHOTOGRAPHS BY MONOLINE SCANNING

The invention relates to a control device for a camera for taking aerial photographs by monoline scanning.

The roll which an aircraft flying horizontally usually undergoes is very disadvantageous when this aircraft carries instruments furnishing results which depend on the ground, as is the case, for example, of cameras for taking aerial photographs. The roll presents the drawback of tilting the co-ordinates relating to the aircraft with respect to the true horizontal plane of the region flown over. The instruments carried by the aircraft undergo the same tilting and the results of the operation carried out are consequently erroneous.

In the case of aerial photographs in which the camera is actuated periodically in the course of the horizontal flight, there is produced on the sensitive film a succession of elementary images which do not fit with each other. It is of course possible to thereafter re-aline the individual photographs, but this involves a considerable amount of work and results in a certain inaccuracy. It is therefore preferable to re-aline automatically in the course of each individual photograph the images by means of an automatic correction of the effect of the roll. Such a correction is based on the measurement of the instantaneous angle of roll.

The aircraft may already carry means for measuring this angle, such as an inertia platform. These means, which serve to effect various measurements and controls for the flight of the aircraft, are very difficult to make available for controlling an independent equipment, such as an aerial camera embarked on the aircraft. Consequently, such means must be independent and embarked with the photographing equipment. Known apparatuses are so large and fragile that it is impossible to envisage constructing them in the form of an independent unit embarked on the aircraft with the photographing equipment.

An object of the present invention is to provide a control device for a camera taking aerial photographs by monoline scanning which can be easily constructed in the form of an independent unit capable of being embarked with the camera. The device according to the invention, which is therefore of small size and great strength, affords the further advantage of being capable of operating substantially immediately at any moment during the flight and of being of rather low cost.

The device according to the invention, which comprises a reflector or a mirror rotatable with respect to a reference plane of an aircraft camping the device, comprises a gyrometer connected to the structure of the aircraft and providing a voltage representing the measurement of the angular velocity of the aircraft in its rolling motion, and an electronic system for integrating, with respect to time, the value of the voltage furnished by the gyrometer, means for producing a first signal, at the moment when the plane of the mirror coincides with the reference plane, means for producing from said first signal a second signal which is modulated in duration by the voltage furnished by said measuring device, means for producing at the end of the second signal a third signal of constant duration, and means for applying said third signal to the control of the effective scanning, by the monoline scanning device, of the ground that the aircraft flies over.

The gyrometer employed is preferably of the type having a mechanical return known per se and comprising a gyroscopic fly wheel mounted on a frame. Its input shaft extends in a direction parallel to the longitudinal axis of the aircraft and toward the nose of the aircraft.

Consequently, this shaft is parallel to the velocity vector of the aircraft, the axis of rotation of the wheel and the output shaft are, at rest, in a vertical plane of the region flown over and the voltage furnished by the gyrometer is proportional to the angular velocity of the rolling motion of the aircraft.

According to the invention, the electronic system integrating said voltage is constructed in such manner that it furnishes an alternating output voltage whose cyclic ratio of the alternations remains in the neighbourhood of unity.

For this purpose, the electronic integration system comprises a main circuit including an adder of the input voltage and a correction voltage and an integrator of the voltage furnished by the adder, said correction voltage being furnished by an auxiliary circuit comprising an amplifier of the output voltage of the main circuit, shaping means, a connecting network having two control terminals, an integrator and a phase corrector.

The auxiliary circuit furnishes a measurement of the mean value of the output voltage of the system which suppresses the accumulative effect produced in the main circuit of the system by the presence of a zero of an erroneous measurement by the inductive sensor of the gyrometer.

It may be assumed that in the course of a normal horizontal flight, the rolling motion of the aircraft is aleatory and of zero mean value so that the output voltage of the main circuit is in fact proportional to the angle of roll by integration, with respect to time, of the angular velocity of roll measured by the gyrometer.

In the case of a device taking photographs by monoline scanning, the device according to the invention serves to control the operation of the scanning device in such manner that the area scanned in the course of each photographing is equally distributed on each side of the vertical of the scanned region.

The invention will be better understood from the ensuing description with reference to the accompanying drawings in which.

Figure 1:
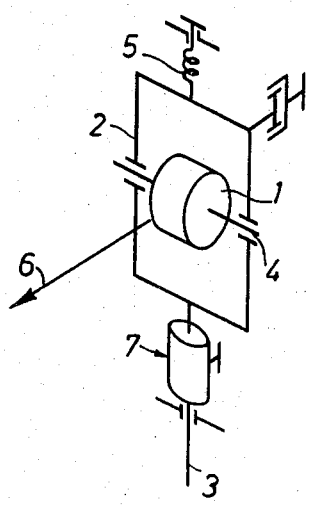
FIG. 1 is a schematic perspective view of a gyrometer.

In FIG. 1 there is shown a gyrometer comprising a gyroscopic fly wheel 1 mounted by gimbals on a frame 2 which bears on two bearings the alignment of which define an output shaft 3 perpendicular to the axis of rotation 4 of the fly wheel. In its rotation about the output shaft 3 the frame 2 is subjected to the effect of a tension spring 5 which produces an elastically yieldable return torque defining, in the absence of any other torque about this shaft, a position of equilibrium.

The input shaft 6 of the gyrometer is by definition perpendicular to the output shaft 3 and to the axis of rotation 4 of the fly wheel. When the gyrometer is subjected to a rotation about the input shaft 6, the gyroscopic effect gives rise to a gyroscopic torque about the output shaft 3 which produces in turn a rotation of the frame 2 about the output shaft 3 until a new position of equilibrium, defined by the equality of the return torque and the gyroscopic torque, is reached.

The output shaft 3 carries a sensor or responsive element 7 which is constituted by an inductive detector of the angle of rotation of this shaft 3 and furnishes a voltage which is proportional to the velocity of rotation of the shaft 3. This measurement contains an inevitable zero error which is eliminated by means which will be described hereinafter. The arrangement of the input shaft 6 parallel to the longitudinal axis of the aircraft and extending toward the nose of the latter, ensures that the angle of rotation of the output shaft 3 is at each instant proportional to the angle of roll of the aircraft; the voltage received at the output of the sensor 7 is therefore proportional to the angular velocity of roll of the aircraft.

Figure 2:
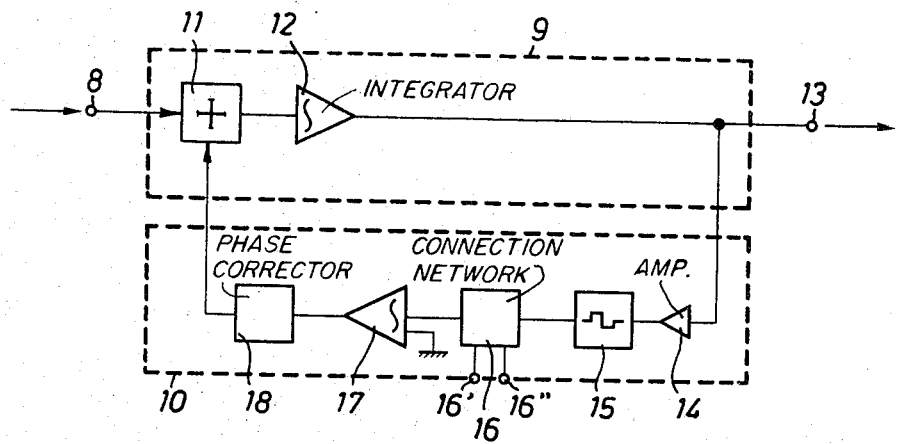
FIG. 2 is a block diagram of an integration system.

The voltage furnished by the sensor 7 at its output 8 is fed in accordance with the invention, into an integration system which is schematically represented in FIG. 2. The integration system comprises a main circuit 9 and an auxiliary circuit 10. The main circuit 9 comprises an adder 11 whose inputs are connected to the output 8 of the sensor 7 and to the output of the auxiliary circuit 10. The output of the adder 11 is fed into an integrator 12 whose output 13 constitutes the output terminal of the integrating system. The auxiliary circuit 10, whose input is connected to the output of the integrator 12 of the main circuit 9, comprises an amplifier 14 followed by a shaping means 15, a connection network 16 having two control terminals 16' and 16", an integrator 17 and a phase corrector 18.

It has already been mentioned that the output voltage of the main circuit is proportional to the angle of roll. This voltage, which is amplified in the amplifier 14, is converted by the means 15 into two rectangular signals of opposite values the duration of which is respectively that of an alternation of the alternating component of the output voltage. The integrator 17 delivers a non-null correction voltage when these durations are different. The auxiliary circuit 10 behaves, therefore, as a unit measuring the cyclic ratio of the alternations of the output voltage, which ratio is made to remain in the neighbourhood of unity by the auxiliary circuit 10 through a feedback loop. Consequently, the mean value of the output voltage remains null and the effect of the false measurement zero coming from the inductive sensor of the gyrometer is thus eliminated. The phase corrector 18 ensures in the usual manner the operational stability of the system.

Figure 3:
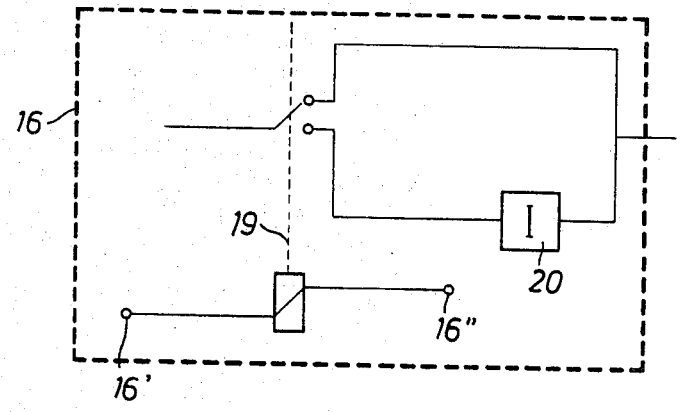
FIG. 3 is a block diagram of a connection network.

The connection network 16 having two terminals, shown in more detail in FIG. 3, is so arranged as to have two manners of operating. A first manner of operating is a rapid response operation so that the mean value of the output voltage is low irrespective of the evolutions of the aircraft; this is the operational condition of rest of the apparatus. The second manner of operating is a slow-response operation so as to ensure a sure integration of the ratio of the output voltage of the assembly; this second manner of operating is that of actual operation of the apparatus. Each of the two manners of operating may be brought into action immediately by the operator or by any suitable means. The connection network 16 comprises for this purpose an electromagnetic relay 19 having two positions which puts out of action or brings into action an attenuator 20. The relay 19 is connected to the two control terminals 16' and 16" which receive a control voltage during the active phase of the flight.

In a particularly interesting application, the device according to the invention may be employed for automatically correcting the effect of the roll on the photographs taken by a monoline scanning apparatus.

Figure 4:
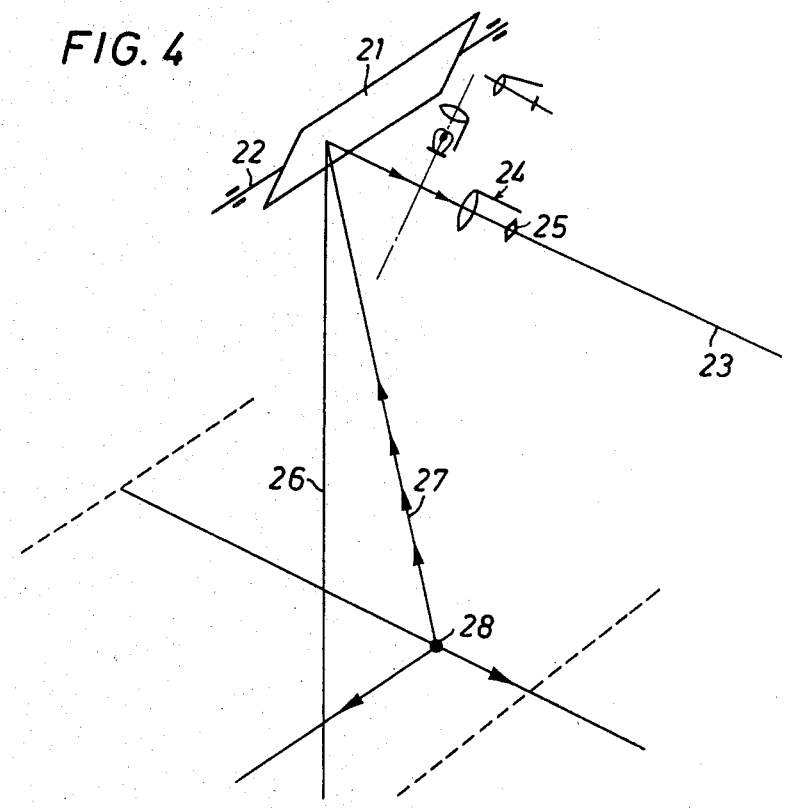
FIG. 4 is a schematic perspective view of a monoline scanning device.

Such an apparatus is well known and shown schematically in FIG. 4. It affords a thermal image of the ground flown over and co-ordinates, in order to produce the total image, the transverse scanning of the ground by a fine scanning beam, the longitudinal scanning of the ground by this beam owing to the horizontal motion of the aircraft carrying the apparatus, an infrared signal received by a detector cell and variable in amplitude in accordance with the intensity of the mean infrared radiation of each area defined on the ground by the impact of the scanning beam, the treatment of the current detected by the cell for producing an image on a photographic film which is continuously unwound and on which is inscribed along fine parallel lines which are more or less dark marks depending on the intensity of the radiation pertaining to each elementary area of the ground scanned.

The transverse scanning of the ground is achieved by an optical arrangement equivalent to a plane mirror 21 (FIG. 4) which rotates at constant speed about an axis 22 perpendicular to the optical axis 23 of an objective 24 having a very small field whose focus is located on the sensitive surface of the detecting cell 25. The axis 23 and the axis 22 define a reference plane which is related to the aircraft and horizontal when the aircraft is in perfectly horizontal flight.

The longitudinal scanning of the ground, which is achieved by the horizontal displacement of the aircraft carrying the apparatus, is synchronized with the unwinding of the photographic film. The production of each elementary image starts for a given inclination of the plane of the mirror 21 on the reference plane and the duration of the recording defines the active angle of rotation of the mirror. The elementary images are placed side-by-side on the film on condition that a theoretical relation is respected between the altitude of the aircraft and its horizontal velocity, from which relation experience has shown that it is possible to deviate rather widely.

Consequently, everything occurs as if a thin optical beam were directed from the apparatus to the ground, the apparatus being provided with a diaphragm defining an optical field of transverse scanning of the ground, for example of the order of 120°, the optical axis of the apparatus being coincident with the vertical from the region flown over in the course of a perfect horizontal flight of the aircraft.

The roll of the aircraft, which is manifested at each instant by an angular deviation between the reference plane defined by the axes 22 and 23 and the true horizontal plane, produces an equal angular deviation between the optical axis 29 of the apparatus and the vertical 26 from the region flown over.

An incident ray 27 coming from the point 28 of the ground scanned at a given instant is reflected from the reflector or mirror 21 along the axis 23 of the objective 24 and the thermal image of the point 28 is formed on the sensitive surface of the detector cell 25.

Figure 5:
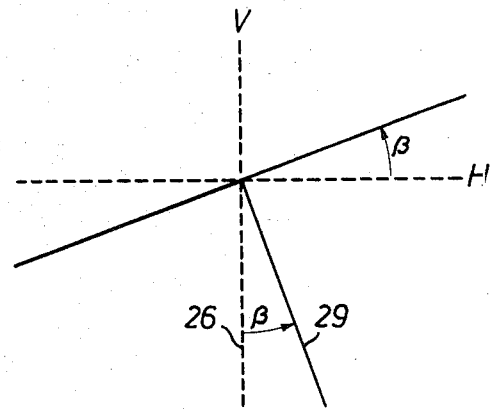
FIG. 5 is a diagram defining the roll angle.
Figure 6:
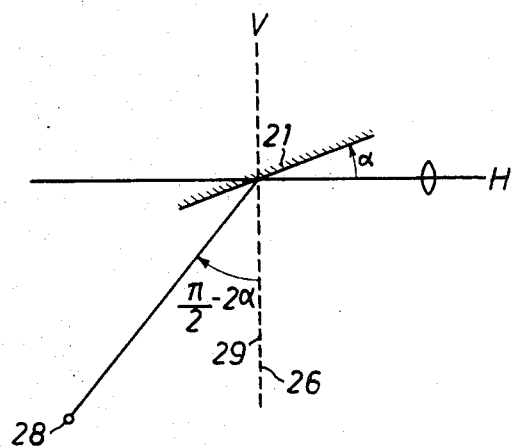
FIG. 6 is a diagram defining the instantaneous position of the monoline scanning device.

If $\alpha$ is termed the instantaneous angle of inclination of the mirror 21 on the reference plane formed by the axes 22 and 23 and $\beta$ the angle through which the optical axis of the apparatus deviates from the vertical from the considered region (FIGS. 5–7), it can be foreseen that $\alpha$ is always positive since the rotation of the mirror always occurs in the same direction but that $\beta$, which is the angle of roll of the aircraft, may be positive or negative since the roll is composed of an oscillation of the aircraft about a horizontal longitudinal axis.

If $\beta = 0$, the scanned area of the ground at this instant deviates from the vertical 26 of the region flown over by an angle equal to $\pi/2 - 2\alpha$.

Figure 7:
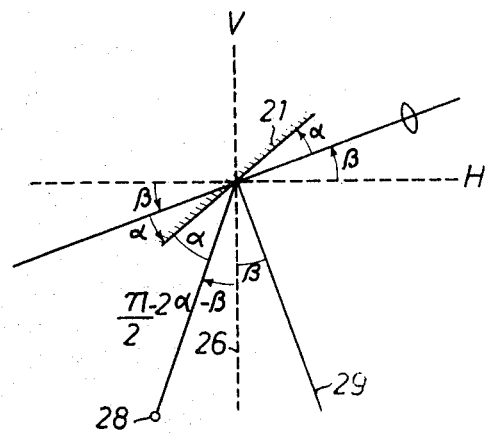
FIG. 7 is a diagram of the effect of the roll on the instantaneous position of the monoline scanning.

If $\beta$ is different from 0, in adopting the usual sign convention, the scanned area of the ground at this instant deviates from the vertical 26 of the region flown over by an angle equal to $\pi/2 - (2\alpha + \beta)$ (FIG. 7).

Figure 10:
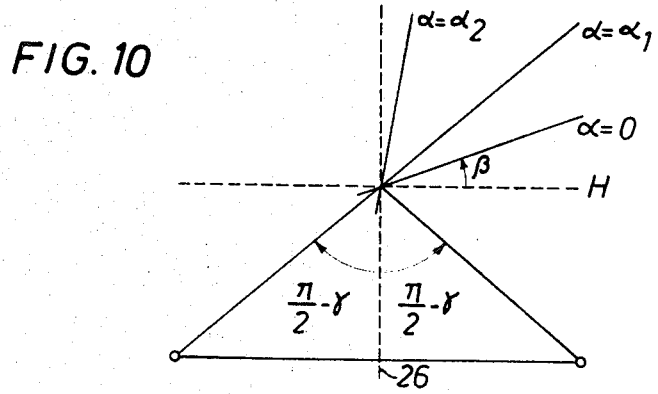
FIG. 10 is a diagram showing the various positions of the monoline scanning device and the area scanned in the course of one cycle of operations.

In employing the measurement of the instantaneous angle of roll effected by the device according to the invention, the effective scanning of the ground is started for an angle of inclination of the mirror $\alpha = \gamma - \beta/2$ (FIG. 10), $\gamma$ being an angle equal to the complement of half the angle of opening of the transverse scanning optical field which corresponds to a scanning area deviated from the vertical of the region flown over by an angle equal to $\pi/2 - \gamma$. Likewise, this scanning is stopped for an angle of inclination of the mirror $\alpha_2 = \pi/2 - (\gamma + \beta/2)$ which corresponds to a scanning deviated from the vertical of the region flown over by an angle equal to $-\pi/2 + \gamma = -(\pi/2 - \gamma)$.

The area scanned during the whole of the effective scanning of the ground is therefore situated between an angle of $(\pi/2 - \gamma)$ and an angle of $-(\pi/2 - \gamma)$, and is therefore distributed equally on each side of the vertical 26 of the region flown over irrespective of the angle of roll $\beta$.

For this purpose, the monoline scanning device equipped with a device for measuring the instantaneous angle of roll according to the invention is characterized by the fact that it comprises means for producing a first signal, at the moment when the plane of the mirror coincides with the reference plane, means for producing from said first signal a second signal modulated in duration by the voltage furnished by said device according to the invention, means for producing at the end of the second signal a third signal of constant duration and means for applying said third signal to the control of the effective scanning, by the monoline scanning device, of the ground flown over by the aircraft carrying the device.

Figure 8:
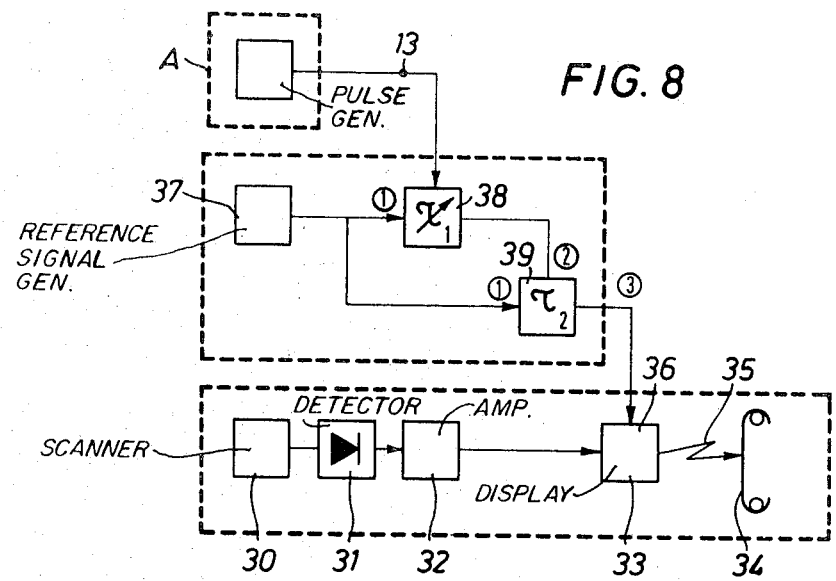
FIG. 8 is a block diagram of the control of a monoline scanning device by the device according to the invention.

All of these means are schematically shown in FIG. 8.

The monoline scanning device comprises in the known manner an electro-optical unit 30 effecting a monoline scanning, an infrared detector cell 31, an amplifying system 32 amplifying the signal detected by the cell 31, a display system 33 such as a cathode-ray tube translating the signal amplified by the system 32 into a visual representation, a continuously unwound photographic film 34 for receiving the visual image representation displayed on the cathode-ray tube and recording the visual representation on the film, a control 35 for the production of an image of the display system 33 on the film 34 and a terminal 36 controlling the operation of the display system 33. The control 35 may be in the form of an optical unit which images the display of the cathode-ray tube onto the film 34. The terminal 36 is for the control of the horizontal scanning of the image. In addition, the terminal 36 may be used for selecting the size or scale of the image, for example, which is displayed on the cathode-ray tube. The selection of the image size can thereby be made commensurate with the size of the image recorded on the film 34.

According to the invention, the control terminal 36 of the horizontal scanning of the image is connected to the output of an optoelectronic unit which comprises a device 37 known per se comprising a lamp, lenses and a photoelectric cell and furnishing an electric current of non-negligible value when the mirror 21 passes through the reference plane related to the aircraft. This current, which has the shape and the function of a synchronization signal, is sent to an impulse generator 38 which furnishes at its output a pulse modulated in duration by the voltage applied to the generator 38 by the output 13 of the device A according to the invention, which impulse begins with the occurrence of an impulse generated by the device 37. The output of the apparatus 38 is applied to the input of a second known apparatus 39 adapted to produce a pulse of constant predetermined duration having for origin the end of the pulse produced by the apparatus 38. The output of the apparatus 39 is connected to the scanning control terminal 36.

The scanning of the image by the electro-optical unit 30 is therefore only active for the duration of the pulse produced by the apparatus 39, the start of this pulse deviating to the extent of a period of time which varies with the angle of roll and is equal to the duration of the pulse produced by the apparatus 38, from an origin time defined by the synchronization signal produced by the device 37.

Owing to the rotation of the mirror 21 at constant velocity, these durations correspond linearly to the angular positions of the mirror 21.

The origin instant at which the device 37 produces the synchronization signal corresponds to an angle $\alpha = 0$.

The instant of the end of the pulse produced by the apparatus 38, which is also the instant of the start of the pulse produced by the apparatus 39, corresponds to an angle $\alpha_1 = \gamma - \beta/2$, that is to say, half the difference between the complement $\gamma$ of half the angle of opening of the transverse scanning optical field and the algebraic value of the instantaneous angle of roll $\beta$ of the aircraft.

The instant of the end of the pulse produced by the apparatus 39 corresponds to an angle $\alpha_2 = \pi/2 - (\gamma +$ $\beta/2$), that is to say, the complement of half the sum of the aforementioned angles. The constant duration of the scanning, equal to the duration of the pulse produced by the apparatus 38, corresponds to the angular path ($\alpha_2 - \alpha_1$) of the mirror which is itself equal to ($\pi/2 - \gamma$), half the angle of opening of the optical field of the transverse scanning of the ground flown over.

Inversely, given the preceding half angle of opening, and the angle of roll being measured, the constant duration of the pulse produced by the apparatus 39 may be predetermined and the variable duration of the pulse produced by the apparatus 38 may be suitably modulated by the voltage corresponding to the magnitude of the angle of roll of the aircraft, these results being obtained by the application of known means to known electronic circuits.

Figure 9:
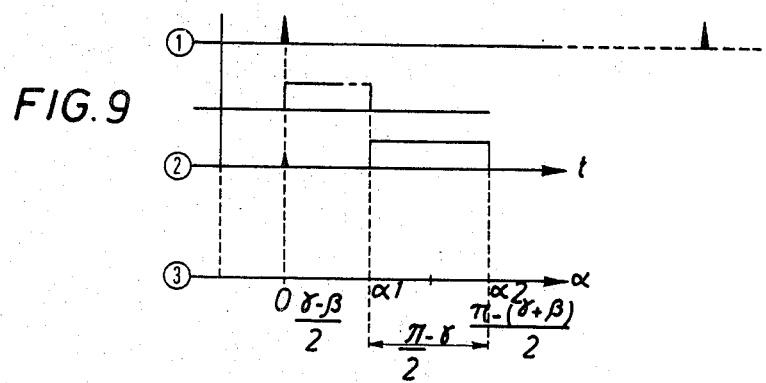
FIG. 9 is a diagram showing the variations in the voltages at the various points of the circuit shown in FIG. 8 as a function of the instantaneous position of the monoline scanning device.

The signals 1) produced by the device 37, 2) produced by the apparatus 38, and 3) produced by the apparatus 39 are shown schematically as a function of the angle $\alpha$ in FIG. 9.

What we claim is:

1. A control device for a camera taking aerial photographs by monoline scanning comprising a reflector rotatable with respect to a reference plane of an aircraft carrying the camera, said control device comprising a gyrometer connected to the structure of the aircraft and furnishing a voltage corresponding to the angular velocity of the aircraft in its rolling motion, and an electronic system for integrating with respect to time the value of the voltage furnished by the gyrometer, means for producing a first impulse signal at the moment when the plane of the mirror is coincident with the reference plane, means for producing a second signal starting at each occurence of said first impulse signal and which is modulated in duration by the voltage from said integrating device, means for producing at the end of said second signal a third signal of constant duration, and means for applying said third signal to the control of the effective scanning, by the monoline scanning device, of the ground flown over by the aircraft.

2. A device as claimed in claim 1, wherein the gyrometer is of the known type having a mechanical return, its input shaft extending in a direction parallel to the longitudinal axis of the aircraft toward the nose of the aircraft.

3. A device as claimed in claim 1, wherein the electronic integration system comprises a main circuit including an adder of the input voltage and a correction voltage, and an integrator of the voltage furnished by the adder, said correction voltage being furnished by an auxiliary circuit comprising an amplifier of the output voltage of the main circuit, shaping means, an integrator and a phase corrector.

4. A device as claimed in claim 3, wherein the auxiliary circuit further comprises a connecting network having two control terminals connected between the shaping means and the integrator.

* * * * *

UNITED STATES PATENT OFFICE
CERTIFICATE OF CORRECTION

Patent No. 3,858,002  Dated December 31, 1974

Inventor(s) GERARD EUGENE BAILLET ET AL

It is certified that error appears in the above-identified patent and that said Letters Patent are hereby corrected as shown below:

Please insert in the heading of the patent:

-- Claims priority from French patent application 72 16220, filed in France on May 5, 1972. --

Signed and Sealed this first Day of June 1976

[SEAL]

Attest:

RUTH C. MASON
*Attesting Officer*

C. MARSHALL DANN
*Commissioner of Patents and Trademarks*